United States Patent
Desprez et al.

(10) Patent No.: US 7,574,015 B2
(45) Date of Patent: Aug. 11, 2009

(54) METHOD OF HANDLING MAIL ITEMS WITH DETECTION OF OCCURRENCES OF OCR ATTRIBUTES

(75) Inventors: Olivier Desprez, Versailles (FR); Christophe Caillon, Bretigny sur Orge (FR); Emmanuel Miette, Saint-Gratien (FR)

(73) Assignee: Solystic, Gentilly Cedex (FR)

( * ) Notice: Subject to any disclaimer, the term of this patent is extended or adjusted under 35 U.S.C. 154(b) by 31 days.

(21) Appl. No.: 10/555,962

(22) PCT Filed: Oct. 10, 2005

(86) PCT No.: PCT/FR2005/050837

§ 371 (c)(1), (2), (4) Date: Jan. 27, 2006

(87) PCT Pub. No.: WO2006/084966

PCT Pub. Date: Aug. 17, 2006

(65) Prior Publication Data

US 2007/0215529 A1   Sep. 20, 2007

(30) Foreign Application Priority Data

Feb. 8, 2005   (FR) .................................. 05 50369

(51) Int. Cl.
    *G06K 9/00* (2006.01)
(52) U.S. Cl. .................. 382/101; 382/100; 382/102
(58) Field of Classification Search ............... 382/101, 382/102; 209/584, 900
    See application file for complete search history.

(56) References Cited

U.S. PATENT DOCUMENTS

| 4,992,649 A * | 2/1991 | Mampe et al. ........... 209/546 |
| 6,697,500 B2 * | 2/2004 | Woolston et al. ........ 382/101 |
| 6,888,084 B1 * | 5/2005 | Bayer ..................... 209/584 |
| 7,081,595 B1 * | 7/2006 | Brandt et al. ............ 209/584 |
| 2004/0005080 A1 * | 1/2004 | Hayduchok ............. 382/101 |
| 2005/0123170 A1 * | 6/2005 | Desprez et al. .......... 382/101 |

FOREIGN PATENT DOCUMENTS

FR   2 841 673 A   1/2004

* cited by examiner

*Primary Examiner*—Matthew C Bella
*Assistant Examiner*—Eric Rush
(74) *Attorney, Agent, or Firm*—Sughrue Mion, PLLC

(57) ABSTRACT

A method of handling mail items includes, during a first sorting pass, taking a digital picture of each mail item, directing the mail item towards a sorting outlet bin, and deriving from the picture a digital fingerprint, and, during a second sorting pass, taking a digital picture of a current mail item to derive a fingerprint, performing automatic address recognition, and searching recorded address data for a match with the address data of the current mail item to identify a current bin to which the current mail item corresponds, so that, in order to search for a match between fingerprints, the search for matching fingerprints is conducted in an exploration space formed by the digital fingerprints that correspond to the current sorting outlet bin.

4 Claims, 4 Drawing Sheets

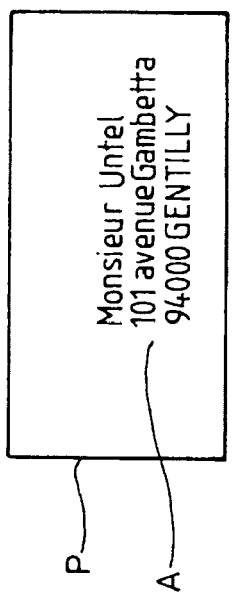
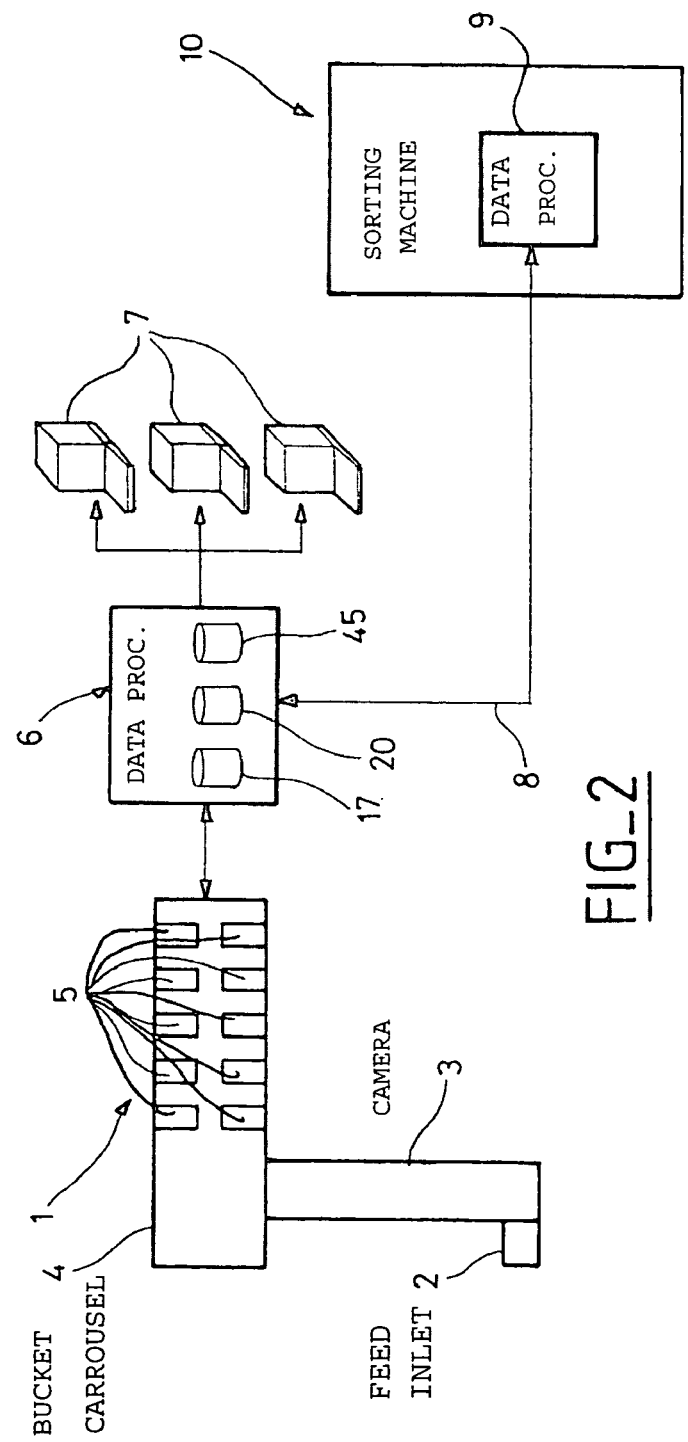

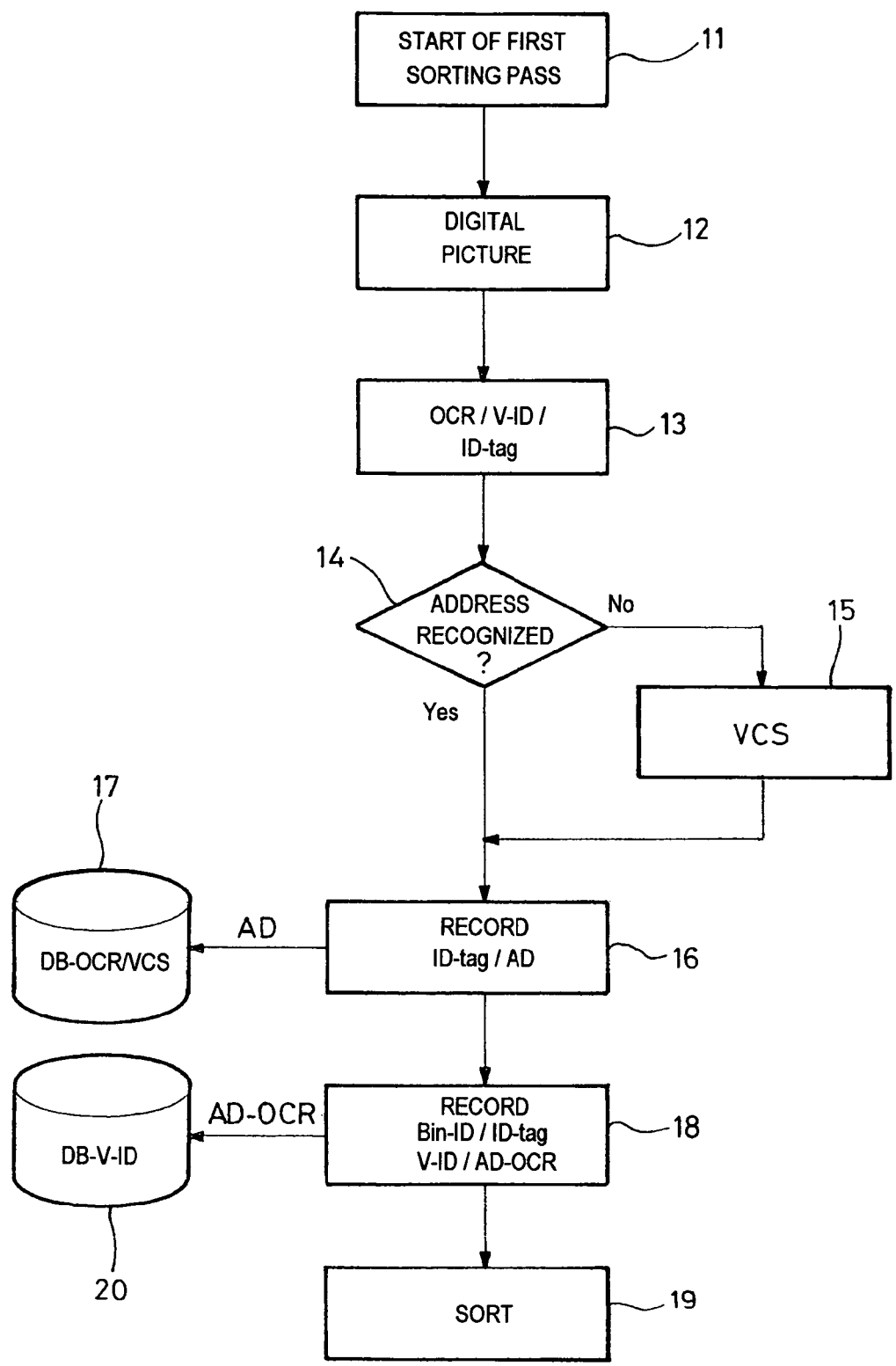

FIG_4

| ID-tag.1 | AD 1 |
|---|---|
| ID-tag.2 | AD 2 |
| ---- | --- |
| ID-tag.N | AD N |

17

Bin-ID 1

| ID-tag.1.1 | V-ID.1.1 | AD-OCR1.1 | M |
|---|---|---|---|
| ID-tag.1.2 | V-ID.1.2 | AD-OCR1.2 | M |
| ---- | --- | --- | --- |
| ID-tag.1.n | V-ID.1.n | AD-OCR1.n | M |

Bin-ID 2

| ID-tag.2.1 | V-ID.2.1 | AD-OCR2.1 | M |
|---|---|---|---|
| ID-tag.2.2 | V-ID.2.2 | AD-OCR2.2 | M |
| --- | --- | --- | --- |
| ID-tag.2.n | V-ID.2.n | AD-OCR2.n | M |

---

Bin-ID i

| ID-tag.i.1 | V-ID.i.1 | AD-OCR i.1 | M |
|---|---|---|---|
| ID-tag.i.2 | V-ID.i.2 | AD-OCR i.2 | M |
| --- | --- | --- | --- |
| ID-tag.i.n | V-ID.i.n | AD-OCR i.n | M |

20

| ID-tag.j.1 | V-ID.j.1 |
|---|---|
| ID-tag.j.2 | V-ID.j.2 |
| --- | --- |
| ID-tag.j.n | V-ID.j.n |

} Bin-ID j

| ID-tag.k.1 | V-ID.k.1 |
|---|---|
| ID-tag.k.2 | V-ID.k.2 |
| --- | --- |
| ID-tag.k.n | V-ID.k.n |

} Bin-ID k

45

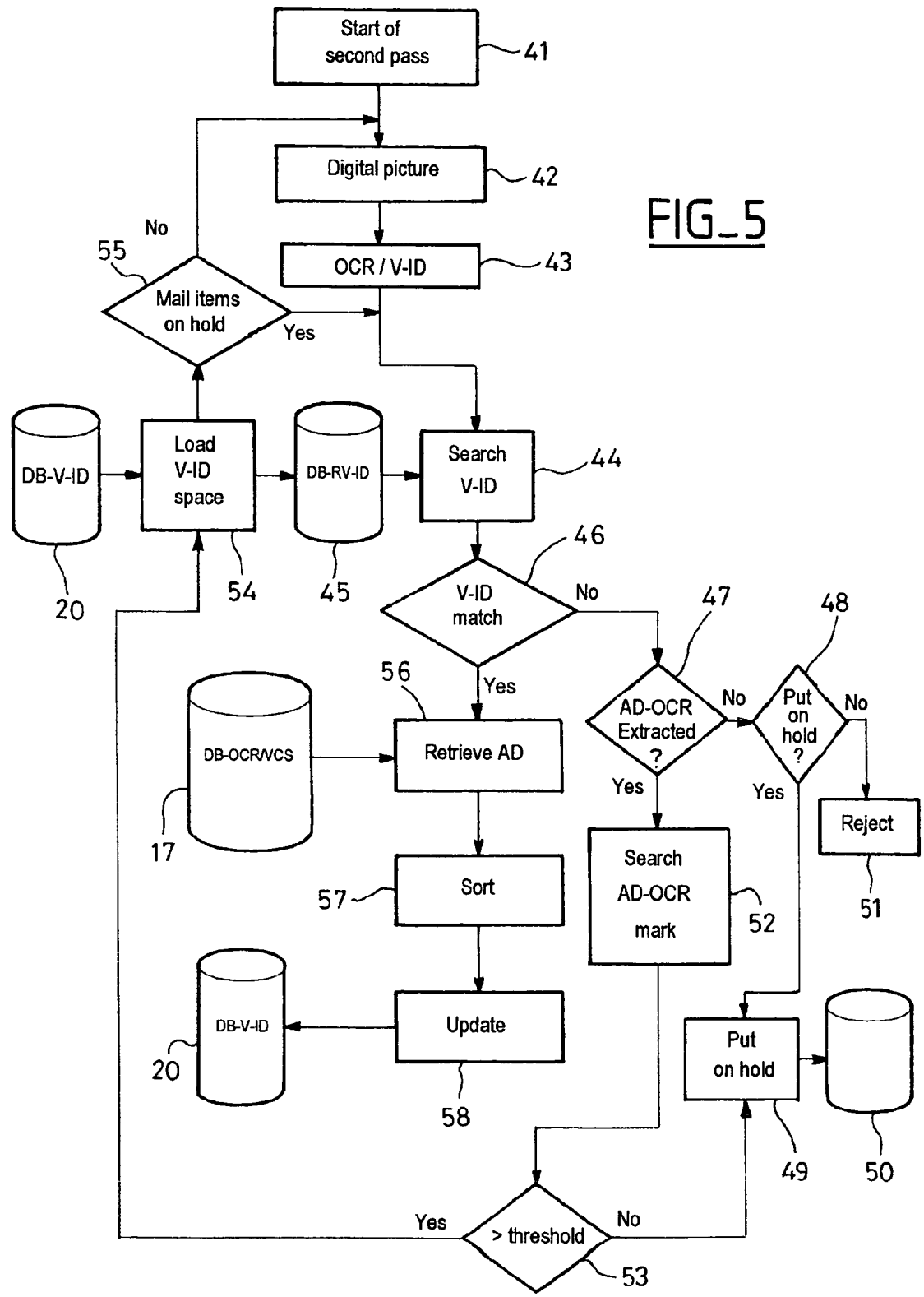
FIG_5

METHOD OF HANDLING MAIL ITEMS WITH DETECTION OF OCCURRENCES OF OCR ATTRIBUTES

BACKGROUND OF THE INVENTION

The present invention relates to a method of handling mail items in a sorting machine having sorting outlets with sorting outlet bins into which the mail items are directed during successive sorting passes;

which method consists, during a first sorting pass for sorting the mail items, in taking a digital picture of each mail item bearing address information for the purpose of automatically recognizing the address of the mail item, in particular by Optical Character Recognition (OCR), in deriving from said picture a digital fingerprint which is a logic identifier for the mail item, and in recording in a memory address data representing the automatically-recognized address of the mail item in correspondence with the digital fingerprint of the mail item and with a logic identifier of the sorting outlet bin into which the mail item is directed; and during a second sorting pass for sorting the mail items, in taking, once again, a digital picture of a current mail item bearing address information for the current mail item, in deriving from said picture a digital fingerprint for the current mail item, and in searching among the digital fingerprints recorded during the first sorting pass for a match with the digital fingerprint of the current mail item, in order to retrieve, in particular the address data representing the address information of the current mail item.

More particularly, the invention relates to a method of automatically sorting mail items in a plurality of passes through one or more sorting machines in which it is not necessary to affix (by printing, optionally on a label) a mail item identifier or "ID tag" to the mail items, in particular an ID tag in the form of a barcode. In the method of the invention, the mail items are identified by a digital "fingerprint" or image signature as described in European Patent Document EP 1 222 037. The use of digital fingerprints or image signatures for identifying the mail items during the successive sorting passes makes it possible to avoid using printer and barcode reader peripherals, to avoid using verifier peripherals for verifying the quality of printing of the barcodes (such verifier peripherals being commonly referred to as "BCVs" (barcode verifiers) in the literature), and to avoid using labelers for sticking labels onto those of the mail items which have plastics surfaces (in particular "flats", i.e. flat mail items such as magazines and newspapers), with this resulting in substantial savings in the cost of the sorting machine and in the cost of maintenance thereof, and also in consumables while the machine is in use.

In Patent Document EP 1 222 037, a barcode is affixed to a wall of each sorting outlet bin, that barcode serving as an identifier for the bin. During the second sorting pass, the barcodes of the bins loaded into the inlet of the machine are read, and an association is made between those bins and the digital fingerprints of the mail items contained in said bins, so that, when a search is conducted in the second pass for a match between the digital fingerprint of a current mail item and the digital fingerprints recorded in the first pass, an exploration space is used that is limited to the fingerprints of the mail items of a single first-pass sorting outlet bin so as to satisfy the requirements of real-time handling. But in that known method, the principle used for reducing the exploration space for exploring digital fingerprints cannot accommodate mail items contained in a plurality of sorting outlet bins from a first sorting pass through a machine be transferred into a single bin so as to be recycled to the inlet of another machine for continuing with the second sorting pass. With that known method, it is also not possible to have breaks in the sequence of the bins, e.g. it is not possible to insert into the second sorting pass mail items contained in a bin that is not a sorting outlet bin coming from the first sorting pass. With that known method, it is essential, in the second pass, to preserve the relative order of the mail items in each bin recycled to the inlet of the sorting machine. That known method thus cannot withstand disturbances that might occur in the feed storage space of the sorting machine, e.g. as a result of the machine jamming.

An object of the invention is to provide a method of sorting mail items in a plurality of sorting passes that uses digital fingerprints to identify the mail items and that is not sensitive to the above-indicated operating constraints.

SUMMARY OF THE INVENTION

To this end, the invention provides a method of handling mail items in a sorting machine having sorting outlets with sorting outlet bins into which the mail items are directed during successive sorting passes;

which method consists, during a first sorting pass for sorting the mail items, in taking a digital picture of each mail item bearing address information for the purpose of automatically recognizing the address of the mail item, in deriving from said picture a digital fingerprint which is a logic identifier for the mail item, and in recording in a memory address data representing the automatically-recognized address of the mail item in correspondence with the digital fingerprint of the mail item and with a logic identifier of the sorting outlet bin into which the mail item is directed; and during a second sorting pass for sorting the mail items, in taking, once again, a digital picture of a current mail item bearing address information for the current mail item, in deriving from said picture a digital fingerprint for the current mail item, and in searching among the digital fingerprints recorded during the first sorting pass for a match with the digital fingerprint of the current mail item;

said method being characterized in that, during the second sorting pass, it further consists:

in also performing automatic address recognition on the basis of the picture of the current mail item in order to obtain address data representing the address of the current mail item; and in searching among the address data recorded in the memory for a match with the address data of the current mail item in order to identify, on the basis of the sorting outlet bin logic identifiers, a current sorting outlet bin from the first sorting pass to which the current mail item corresponds, so that, in order to search for a match between two digital fingerprints, said search for matching digital fingerprints is conducted in an exploration space formed by the digital fingerprints that correspond to said current sorting outlet bin.

The basic idea of the method of the invention is thus to identify automatically the bins of mail items by using OCR to recognize a few mail items of the bin in order to reduce the fingerprint exploration space. The method of the invention applies to handling in which the successive sorting passes can be performed on a plurality of sorting machines (including with segmentation of the outward sorting/inward sorting type) equipped with sorting outlet bins that are single or compartmented. The method of the invention applies to mail handling in which the search for matching fingerprints serves to retrieve data indicative of address information, but it can, in the same way, apply to mail handling in which the search for matching fingerprints serves to monitor (trace) the mail items in the machines.

The method of the invention can have the following features:
- in order to identify a current sorting outlet bin from the first sorting pass, occurrences for which matching between address data is obtained are counted for successive mail items;
- if no matching is detected between the digital fingerprint of the current mail item and the digital fingerprints forming the exploration space, the current mail item is put on hold, and the search for matching digital fingerprints is started again for said current mail item after the exploration space has been updated with digital fingerprints that correspond to another sorting outlet bin from the first sorting pass; and
- the number of times a current mail item is put on hold is counted and the current mail item is rejected if it is detected that the number of times said current mail item has been put on hold is greater than a certain threshold.

BRIEF DESCRIPTION OF THE DRAWINGS

An implementation of the method of the invention is described in detail below and is illustrated by the drawings. This description is given merely by way of indicative example and in no way limits the invention. In the drawings:

FIG. 1 is a highly diagrammatic view of a mail item;

FIG. 2 is a diagrammatic view of a sorting machine for implementing the method of the invention;

FIG. 3 is a flow chart showing how the method of the invention proceeds during a first sorting pass;

FIG. 4 shows the organization of the data in the memory of the sorting machine; and FIG. 5 is a flow chart showing how the method of the invention proceeds during a second sorting pass.

DETAILED DISCRIPTION OF THE INVENTION

FIG. 1 shows a mail item P bearing delivery address information A. This mail item can be merely a letter, or else a small-format or large-format flat such as a magazine, a newspaper, or a catalogue with a plastics or paper wrapper.

FIG. 2 diagrammatically shows a sorting machine 1 implementing a method of the invention.

The sorting machine 1 conventionally comprises a feed inlet 2 with a storage space and an unstacker for standing mail items such as P on edge, a digital camera 3 for taking a picture of the surface of each mail item P that bears delivery address information A, and a bucket carrousel 4 that directs the mail items towards sorting outlets, each of which is equipped with a sorting outlet bin 5. Each outlet can be equipped with a plurality of sorting outlet bins (typically one front bin and one back bin) or with one compartmented bin without going beyond the ambit of the invention.

FIG. 2 also shows a data processing system 6 associated with a video-coding system 7. The systems 6 and 7 constitute an OCR address recognition system which, on the basis of a picture of a mail item P taken by the camera 3, extracts, automatically or via action from a video-coding operator, the address information A on the basis of which a sorting destination is determined for the mail item, which destination corresponds to a sorting outlet of the machine. In addition, the system 6 of the invention is arranged to deliver, from each digital picture of a mail item taken by the camera 3, a digital fingerprint or image signature constituting a logic identifier for the mail item.

FIG. 2 also shows a system 9 that is analogous to the system 6 but that is part of another sorting machine 10, and that is connected to the system 6 for communications purposes, e.g. via a telecommunications network 8, for use of the method of the invention in a process of sorting in a plurality of sorting passes on a plurality of sorting machines.

In the method of the invention, the mail items are sorted in a plurality of sorting passes, e.g. in two sorting passes.

FIGS. 3 and 5 respectively show the steps of the method of the invention for a first sorting pass and for a second sorting pass on a single machine such as 1.

With reference to FIG. 3, in the initial step 11, the mail to be sorted is prepared at the inlet of the machine 1, and empty bins are loaded into the sorting outlets of the machine. Logic identifiers Bin-ID are allocated in a memory by the machine 1 to each sorting outlet bin. By way of example of a logic identifier for a bin, it is possible to use a concatenation of the following items of information: sorting site identifier/sorting machine number/number of the sorting outlet in the machine/date/time.

In step 12, the mail items are unstacked and put into series for going past the camera 3. A picture of the surface of each mail item is taken and recorded in a memory in the system 6.

At 13, on the basis of the picture of a mail item, OCR is used for automatically recognizing the address information A at the same time as a digital fingerprint V-ID serving as a logic identifier for the mail item is derived in the computer 6. In the system 6, another logic identifier for the mail item, e.g. in the form of a number such as an ID tag can also be allocated to the mail item.

In step 14, if unambiguous address information A is obtained by the automatic OCR address recognition, the data AD representing the address information for the mail item in question is recorded in correspondence with the temporary mail item number ID-tag in a memory in step 16. In FIG. 3, reference 17 designates a database indicated by DB-OCR/VCS in which, for each mail item, the temporary number ID-tag allocated to the mail item and the data representing the address of the mail item are recorded in correspondence, the temporary number ID-tag serving as an access key for accessing the database for the purpose of subsequently retrieving the address data during a second sorting pass. In step 14, if the automatic OCR address recognition gives a partial result, i.e. ambiguous delivery address information, or indeed no result, the digital picture of the mail item is sent (step 15) to the video-coding system 7 for the purpose of having the address information extracted by a video coding operator, whereupon the address data extracted through the system 7 is recorded in correspondence with a mail item temporary number ID-tag in the database 17 in step 16.

In the method of the invention, in step 18, also for the mail item in question, the digital fingerprint V-ID of the mail item (resulting from step 13) is recorded in a digital fingerprints database (referred to as DB-VID) in correspondence with the address data obtained automatically by OCR (in step 13), with the temporary number ID-tag of the mail item, and with the logic identifier Bin-ID of the sorting outlet bin into which the mail item is directed. The address data recorded in the database 20 is data obtained exclusively by automatic OCR address recognition, i.e. without action from a video coding operator.

In step 19, the first sorting pass continues with the mail item being conveyed to the corresponding sorting outlet of the machine and the mail item being unloaded into the bin of said sorting outlet. This process loops back (not shown) to step 13 for each mail item unstacked at the inlet of the machine optionally with the full bins being managed during the first sorting pass.

FIG. 4 is a highly diagrammatic view of the structure of the recordings in the databases 17 and 20.

In particular, for the database 17, a plurality of recordings are shown, in each of which a temporary mail item number ID-tag1, ID-tag2, ID-tagn that serves as an access key is recorded in correspondence with address data AD1, AD2, ADn obtained by OCR address recognition optionally supplemented by a video coding system VCS.

FIG. 4 shows the database 20 in a structured form that consists, in this example, of a set of tables, each of which is identified for a bin logic identifier Bin-ID1, Bin-ID2, Bin-IDi. Each table identified by Bin-ID contains a set of recordings corresponding to respective ones of mail items contained in a sorting outlet bin. Each recording of a table contains, in this example, the temporary number allocated to a mail item ID-tag1.1, . . . , ID-tagi.n, the digital fingerprint V-ID1.1, . . . , V-IDi.n of the mail item, and the address data AD-OCR1.1, . . . , AD-OCRi.n of the mail item that are obtained exclusively by automatic recognition. Each recording of a table includes an additional field indicated by M and which serves as a marker in the progress of the method of the invention, as explained below. It should be understood that the subdivision of the tables 17 and 20 shown in FIG. 4 is given merely by way of non-limiting example.

FIG. 5 shows the steps of the method of the invention during a second pass for sorting the mail items.

In step 41, the sorted mail items contained in the sorting outlet bins from the first sorting pass are sent back into the inlet of the sorting machine 1, and empty bins are inserted into the sorting outlets of the machine 1.

During the second sorting pass, the method of the invention uses the database 20 and another, temporary database indicated by 45 in FIGS. 4 and 5 and which contains digital fingerprints V-ID forming the exploration space indicated by BR-RV-ID for searching for a match between two digital fingerprints as described below. This temporary database 45 is initialized in step 41 and, at this stage of the beginning of the second sorting pass, contains no recording.

In step 42, the mail items in the storage space of the sorting machine are unstacked so as to go, in series, past the camera 3. A picture is taken, once again, of the surface of each mail item bearing the address information A, and, in step 43, a digital fingerprint V-ID is derived from said picture for a current mail item.

In the method of the invention, in step 43, automatic OCR address recognition is also performed on the picture of the current mail item in order to obtain, also by OCR, address data representing the address of the current mail item.

In step 44, a search is conducted for a match between the digital fingerprint of the current mail item and the digital fingerprints recorded in the database 45. As indicated above, at the start of the second sorting pass, the database 45 is empty, and thus, for the first current mail item, in step 44, no match is found between two digital fingerprints. If no match is found in step 46 after step 44, the process continues in step 47 in which it is determined whether the automatic OCR address recognition performed in step 43 has succeeded. In practice, it can, for example, be considered that the automatic OCR address recognition performed in step 43 has succeeded if an outward sorting code and an inward sorting code have been obtained that constitute the address data recorded in the database 20.

When, in step 47, it is detected that the automatic OCR address recognition has not succeeded in step 43, then, in step 48, it is checked whether the current mail item can be put on hold. It is possible to consider, initially, that a mail item can be put on handling hold only for a defined period of time, e.g. for a period of time of 10 seconds, and that, beyond that period of time, the mail item put on hold must be rejected (step 51 indicated by "Reject" in FIG. 5).

If, in step 48, the current mail item can be put on hold, then, in step 49, a logic identifier of the mail item, e.g. the ID tag, is kept in the memory in a waiting list 50.

If, in step 47, it is detected that the automatic OCR address recognition has succeeded in step 43, then, in step 52, a search is conducted for a match between the address data AD-OCR of the current mail item and the address data AD-OCR recorded in the database 20 so as to identify in the database 20 one or more recordings for which matching has been detected, said recordings are identified by modifying the state of their marker M, and, for each sorting outlet bin in the database 20, the occurrences for which a match is obtained between address data are counted.

In step 53, if a sufficient number of marked occurrences are not detected in the database 20 for a sorting outlet bin, the current mail item can be put on hold in step 49. If, in step 53, it is detected in the database that, for a sorting outlet bin, there are a number of marked occurrences greater than a certain threshold, e.g. three occurrences for the same bin, then, in step 54, all of the recordings of the sorting outlet bin in the database 20 are loaded into the database 45 (database BD-RV-ID), these recordings then defining the exploration space for searching for a match between two digital fingerprints.

FIG. 4 shows the structure of the fingerprint exploration space constituted by the database 45 that is formed by the fingerprints of mail items in the bin indicated by Bin-IDj. For example, for the bin Bin-IDj, FIG. 4 shows three recordings, each of which has the digital fingerprint V-ID.j.1, V-ID.j.2, V-ID.j.n of a mail item and the identifier ID-tag.j.1, ID-tag.j.2, ID-tag.j.n. for the mail items 1 to n of the bin. In practice, each sorting bin can contain several tens of mail items, e.g. about fifty mail items, which represents the horizon (depth) of the exploration space. In the method of the invention, the exploration space can be formed by the digital fingerprints V-ID of the mail items of more than one bin, e.g. two bins, as shown in FIG. 4, with the recordings of the bin indicated by Bin-IDk. In which case, the size of the exploration space is increased, but so is the probability of obtaining a fingerprint match for situations in which a plurality of sorting outlet bins in the first sorting pass have been emptied in the feed storage space of the machine without complying with the sequence of the mail items before starting the second sorting pass.

In which case, provision can be made, in step 54, to refresh the database 45 in part by, for example, replacing the fingerprints of the oldest bin in the database 45 with the fingerprints of the mail items of a bin for which it has just been detected that the occurrence-counting threshold has been crossed. Thus, at each update of the database 45, the fingerprints for the mail items of one in every two bins are replaced.

In step 55, if the list of the mail items on hold 50 is not empty, this list is scanned as a priority while performing the steps 44 and 46 on each mail item on hold that is indicated in the list in the same way as for a current mail item. Normally, in step 46, a match is detected between the digital fingerprint of a mail item (retrieved from the waiting list 50) and one of the digital fingerprints recorded in the exploration space 45. On the basis of the association between the fingerprint found in the exploration space 45 and the identifier ID-tag, the address data AD for the mail item in question is retrieved from the database 17 (step 56) and the mail item is directed to a corresponding sorting outlet (step 57). In step 58, the horizon of the exploration space is reduced by updating the database 45 by marking the recording that corresponds to the digital fingerprint found in step 46 for possible deletion. The database 20 is also updated by initializing the markers 20 in the recordings corresponding to the bins that are not loaded into the database 45 in step 54. Optionally, the waiting list 50 is updated by deleting the identifier ID-tag that corresponds to the digital fingerprint found in step 46.

As indicated above, in step 44, the mail items put on hold in the waiting list 50 are handled as a priority. If, in step 46, no match is detected for the current mail item, said current mail item can be put directly on hold again in step 49. In step 49, if it is detected that a mail item is put on hold a number of times greater than a certain threshold, it is possible to reject the mail item (manual handling in step 51).

After step 58, the process loops back to step 42 for handling a subsequent mail item in the waiting list 50 or another mail item.

If the second sorting pass is performed on a sorting machine other than 10, then, in step 41, the database 20 compiled in the machine 1 is transferred to the system 9.

As indicated above, the method of the invention withstands disturbances to the order of the mail items in the second sorting pass following transfer between bins, or a break in the sequence, for example.

The invention claimed is:

1. A method of handling mail items in a sorting machine having sorting outlets with sorting outlet bins into which the mail items are directed during successive sorting passes, said method comprising the steps of:
    a) during a first sorting pass for sorting the mail items, taking a digital picture of a mail item bearing address information, performing an automatic address recognition process including an OCR process on said picture to provide address data to direct said mail item towards a sorting outlet bin, deriving from said picture a digital fingerprint which is a logic identifier for the mail item and recording in a database said address data of the mail item in correspondence with said digital fingerprint of the mail item and with a logical identifier allocated to the sorting outlet bin towards which said mail item is directed, the logical identifiers allocated to said sorting outlet bins subdividing the database into sections associated each to a sorting outlet bin logical identifier; and
    b) during a second sorting pass for sorting a current mail item, taking, once again, a current digital picture of said current mail item bearing address information, deriving from said picture a current digital fingerprint for the current mail item, performing said OCR process on said current digital picture to automatically provide current address data for said current mail item; comparing said current address data with said address data recorded in said database to detect matching occurrences between said current address data and said recorded address data, counting said matching occurrences for each section, detecting a section associated to a certain sorting outlet bin logical identifier for which the counting result is greater than a certain threshold, loading a memory exploration space with digital fingerprints corresponding to said certain sorting outlet bin logical identifier, and detecting a match between said current fingerprint and the fingerprints loaded in said memory exploration space to retrieve a corresponding sorting address data for directing said current mail item towards a sorting outlet bin.

2. A method according to claim 1, in which, if no matching is detected between the digital fingerprint of the current mail item and the digital fingerprints loaded in said memory exploration space, the current mail item is put on hold, and the search for matching digital fingerprints is started again for said current mail item after the exploration space has been updated with digital fingerprints that correspond to another section.

3. A method according to claim 2, in which the number of times a current mail item is put on hold is counted and the current mail item is rejected if it is detected that the number of times said current mail item has been put on hold is greater than a certain threshold.

4. A mail item sorting machine having sorting outlets with sorting outlet bins into which mail items are directed during successive sorting passes, wherein the sorting machine comprises:
    a digital camera for taking a digital picture of a mail item bearing address information during first sorting pass, said digital camera being further arranged, during a second sorting pass, for taking a current digital picture of said current mail item bearing address information,
    a data processing system arranged, during a first sorting pass, for performing an automatic address recognition process including an OCR process on said picture to provide address data to direct said mail item towards a sorting outlet bin, for deriving from said picture a digital fingerprint which is a logic identifier for the mail item and for recording in a database said address data of the mail item in correspondence with said digital fingerprint of the mail item and with a logical identifier allocated to the sorting outlet bin towards which said mail item is directed, the logical identifiers allocated to said sorting outlet bins subdividing the database into sections associated each to a sorting outlet bin logical identifier;
    said data processing system being further arranged, during a second sorting pass, for deriving from said picture a current digital fingerprint for the current mail item, performing said OCR process on said current digital picture to automatically provide current address data for said current mail item; for comparing said current address data with said address data recorded in said database to detect matching occurrences between said current address data and said recorded address data, counting said matching occurrences for each section, detecting a section associated to a certain sorting outlet bin logical identifier for which the counting result is greater than a certain threshold, loading a memory exploration space with digital fingerprints corresponding to said certain sorting outlet bin logical identifier, and detecting a match between said current fingerprint and the fingerprints loaded in said memory exploration space to retrieve a corresponding sorting address data for directing said current mail item towards a sorting outlet bin.

* * * * *